(12) United States Patent
Pollmeyer et al.

(10) Patent No.: US 8,556,282 B2
(45) Date of Patent: Oct. 15, 2013

(54) AXLE FOR A MOTOR VEHICLE

(75) Inventors: Stephan Pollmeyer, Friedrichshafen (DE); Volker Wagner, Ravensburg (DE); Gabriele Fruhmann, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 90 days.

(21) Appl. No.: 13/128,699

(22) PCT Filed: Dec. 9, 2009

(86) PCT No.: PCT/EP2009/066660
§ 371 (c)(1),
(2), (4) Date: May 11, 2011

(87) PCT Pub. No.: WO2010/072563
PCT Pub. Date: Jul. 1, 2010

(65) Prior Publication Data
US 2011/0260424 A1   Oct. 27, 2011

(30) Foreign Application Priority Data
Dec. 15, 2008   (DE) .................. 10 2008 054 669

(51) Int. Cl.
*B60G 11/08* (2006.01)
(52) U.S. Cl.
USPC ....... 280/124.171; 280/124.107; 280/124.128
(58) Field of Classification Search
USPC ............. 280/124.125, 124.128, 124.107, 280/124.106, 124.17, 124.171, 124.172, 280/124.173; 267/36.1, 39, 41
IPC ....................................................... B60G 11/08
See application file for complete search history.

(56) References Cited

U.S. PATENT DOCUMENTS

| | | | | |
|---|---|---|---|---|
| 2,697,613 A | * | 12/1954 | Giacosa | 280/124.14 |
| 4,422,666 A | * | 12/1983 | Proctor | 280/86.757 |
| 4,725,074 A | * | 2/1988 | Stevens | 280/124.128 |
| 4,854,606 A | * | 8/1989 | de Goncourt et al. | 280/124.14 |
| 5,046,753 A | * | 9/1991 | Giovanni | 180/362 |

(Continued)

FOREIGN PATENT DOCUMENTS

| | | |
|---|---|---|
| DE | 33 29 686 A1 | 3/1985 |
| DE | 37 42 752 A1 | 7/1988 |

(Continued)

OTHER PUBLICATIONS

Office Action issued in corresponding Chinese application No. 200980150507.2 issued on Mar. 13, 2013.

*Primary Examiner* — Ruth Ilan
(74) *Attorney, Agent, or Firm* — Davis & Bujold, PLLC

(57) ABSTRACT

An axle for a motor vehicle comprises at least a transverse leaf spring (1) attached directly, or via an auxiliary support frame, to a body (9) of the motor vehicle by two first mountings (4), two control arms (2) and two wheel carriers (3). In each case, an end of the transverse leaf spring (1) facing toward a respective wheel (10) of the motor vehicle is rigidly connected to one of the two control arms (2), and both of the two control arms (2) are each orientated substantially in the longitudinal direction of the motor vehicle. Each of the control arms (2) is connected by a second mounting (7) directly, or via an auxiliary support frame, to the body (9) and also connected, by at least one third mounting (5, 6), to one of the wheel carriers (3).

10 Claims, 3 Drawing Sheets

(56) References Cited

U.S. PATENT DOCUMENTS

| | | | |
|---|---|---|---|
| 5,826,896 A * | 10/1998 | Baumann | 280/124.171 |
| 6,390,486 B1 * | 5/2002 | Boes et al. | 280/124.171 |
| 6,530,587 B2 * | 3/2003 | Lawson et al. | 280/124.17 |
| 6,616,159 B2 * | 9/2003 | Lawson | 280/124.135 |
| 6,863,290 B2 * | 3/2005 | Yokoyama | 280/124.171 |
| 7,029,017 B2 * | 4/2006 | Zandbergen et al. | 280/124.106 |
| 2002/0000703 A1 | 1/2002 | Lawson et al. | |

FOREIGN PATENT DOCUMENTS

| | | |
|---|---|---|
| DE | 102 21 993 A1 | 11/2003 |
| EP | 1 080 953 A1 | 3/2001 |
| EP | 2 030 813 A1 | 3/2009 |
| WO | 96/27507 A1 | 9/1996 |

* cited by examiner

AXLE FOR A MOTOR VEHICLE

This application is a National Stage completion of PCT/EP2009/066660 filed Dec. 9, 2009, which claims priority from German patent application serial no. 10 2008 054 669.0 filed Dec. 15, 2008.

FIELD OF THE INVENTION

The present invention relates to an axle for a motor vehicle.

BACKGROUND OF THE INVENTION

From DE 10221993 B4 a wheel suspension system for non-steered wheels of motor vehicles is known, with a lower transverse control arm of torsionally rigid structure articulated to the vehicle body or to an auxiliary support frame, onto which a wheel carrier is articulated at two mounting points, and with two further individual control arms also articulated above it to the body and to the wheel carrier, such that one mounting point between the lower transverse control arm and the wheel carrier is designed to be flexible in the transverse direction. In this case one of the mounting points is formed by two bearings nested in one another, of which the bearing that co-operates with the transverse control arm is a torsion bearing and the bearing that co-operates with the wheel carrier is a thrust pressure bearing, such that the bearing can be loaded under thrust in the transverse direction and under pressure in the vertical direction.

Furthermore, from WO 96/27507 a wheel suspension system for a vehicle axle with two wheels is known, which has a transverse leaf spring with two-point mounting and a respective wheel carrier in each case, wherein a one-piece, continuous and wheel-guiding composite-material transverse leaf spring is provided, which consists of plastic reinforced with mostly longitudinally orientated technically continuous filaments. In this known wheel suspension system the two-point mounting has high rigidity in the transverse direction; the composite-material transverse leaf spring has a spring constant in the driving direction and a spring constant in the vertical direction, such that the ratio of these spring constants relative to one another is at least 15 and at articulation points the ends of the leaf spring are articulated directly to the wheel carriers. In this case a wheel-guiding element that supports longitudinal and transverse forces is provided, which connects the wheel carriers flexibly to the chassis so that, with the transverse leaf spring and the wheel-guiding element, all the wheel forces can be absorbed.

SUMMARY OF THE INVENTION

The purpose of the present invention is to provide an axle for a motor vehicle, which is characterized by high function integration; in addition the axle according to the invention should be lighter than those known from the prior art. Thereby, on the one hand cost savings should be achieved and on the other hand the kinematics should be influenced positively.

According to these, an axle for a motor vehicle is proposed which comprises at the least a transverse leaf spring preferably in the form of a fiber-composite component, and two control arms and two wheel carriers. According to the invention the transverse leaf spring is fixed to a body of the motor vehicle by two first mountings, either directly or via an auxiliary support frame, such that in each case an end of the transverse leaf spring facing toward a wheel of the motor vehicle is rigidly connected to one of the control arms, which is orientated substantially in the longitudinal direction of the motor vehicle. In this case the control arms are in each case connected, directly or via an auxiliary support frame, to the body by a respective second mounting and, in each case by at least one respective third mounting, to one of the wheel carriers. Thereby, the bearings together with the wheel-facing ends of the transverse leaf spring form a wheel-guiding element which takes over the function of a trapezoidal link.

Advantageously, by virtue of the four-point mounting of the transverse leaf spring formed by the rigid connections to the control arms at the ends and by the attachments to the body of the motor vehicle, both vertical and rolling suspension can be realized, with the result that the body springs and stabilizers known from the prior art can be omitted.

According to the invention a camber control arm connected to the respective wheel carriers can be provided, which is connected to the body directly or via an auxiliary support frame.

As already explained, the axle components can be connected to the vehicle body both directly or via an auxiliary support frame, and when the axle components are attached by means of a support frame this enables the axle to be pre-assembled. Compared with an ordinary steel structure, making the transverse leaf spring as a fiber-composite component results in substantial weight advantages and high elasticity. As fiber materials, glass fibers, carbon fibers or aramide fibers are preferred.

In a preferred embodiment, the axle according to the invention is a non-steered axle of a motor vehicle.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

FIGS. 1, 2, 3, 4 and 5 illustrate an axle of a motor vehicle designed according to the invention. The axle comprises a transverse leaf spring 1, which is attached to the body 9 of the motor vehicle directly or via an auxiliary support frame by two first mountings 4. In particular, the first mountings 4 are preferably in the form of rubber-metal mountings in order to ensure high mobility of the transverse leaf spring 1 relative to the body 9.

Figure 1:
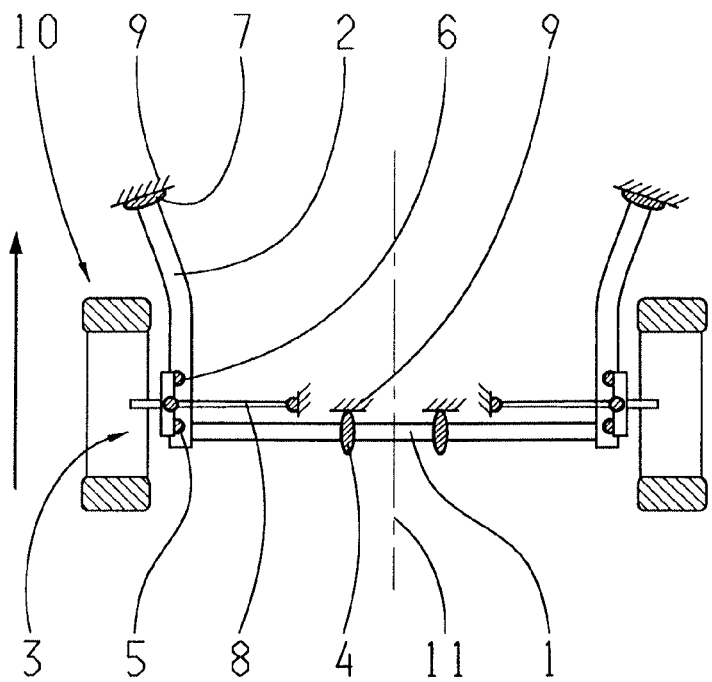
FIG. 1: Schematic plan view of the wheel suspension system of an axle according to the invention.

As can be seen from FIGS. 1, 2, 3, 4 and 5, the end of the transverse leaf spring 1 facing each wheel 10 is connected rigidly to a respective control arm 2, the control arms 2 being orientated substantially in the longitudinal direction 11 of the motor vehicle; in FIG. 1 the forward driving direction of the motor vehicle is indicated by the arrow.

Referring to FIG. 1, the control arms 2 are each connected by a respective second mounting 7, directly or via an auxiliary support frame, to the vehicle body 9 and in each case by two third mountings 5, 6 to the respective wheel carrier 3, so that together with the wheel-facing ends of the transverse leaf spring 1 a wheel-guiding element is produced, which takes over the function of a conventional trapezoidal link.

Figure 2:
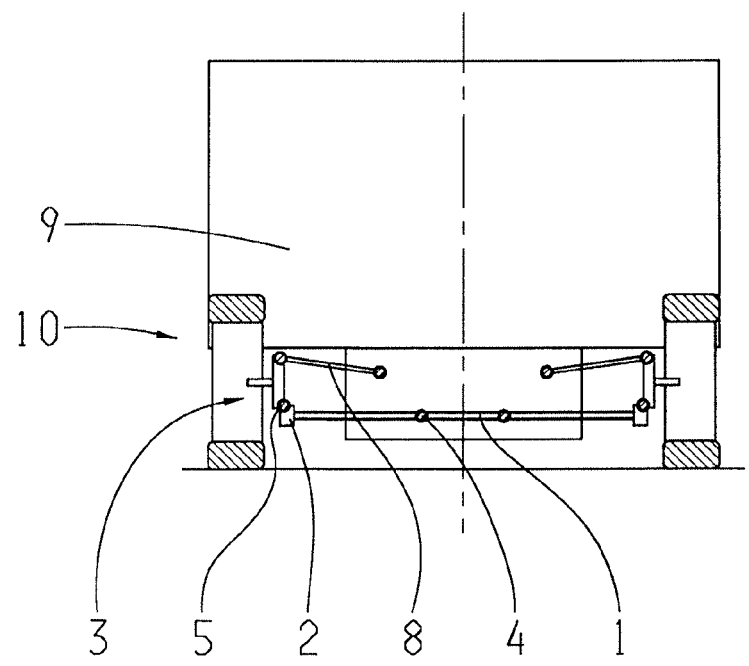
FIG. 2: Schematic front view of the wheel suspension system of an axle according to the invention.
Figure 3:
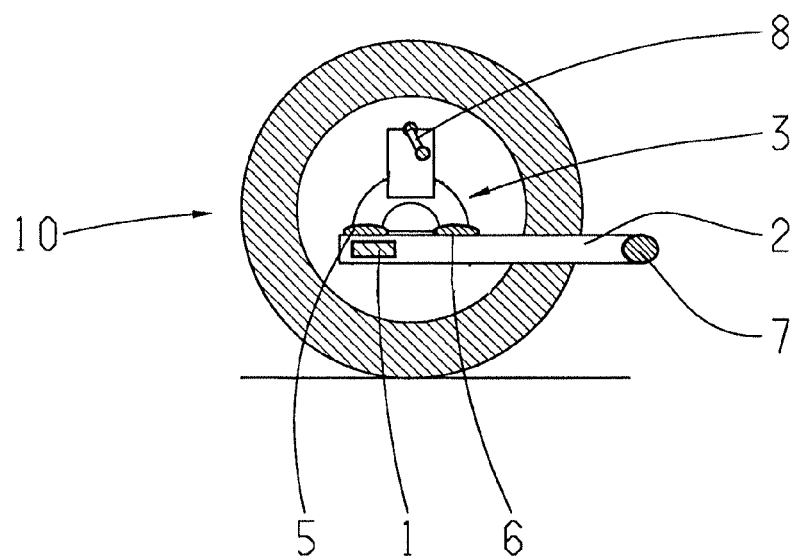
FIG. 3: Schematic side view of the wheel suspension system of an axle according to the invention, as seen from inside.

As can be seen particularly clearly in FIG. 2, each wheel carrier 3 is associated with a camber control arm 8 connected to it, which is connected to the body 9 directly or via an auxiliary support frame.

By virtue of the four-point mounting of the transverse leaf spring 1 produced by the first mountings 4 and the rigid connections to the control arms 2, effective vertical and roll suspension is realized so that, in an advantageous manner, the body springs and stabilizers known from the prior art can be omitted. This is made clear by FIGS. 4 and 5, which show a front view of the axle corresponding to FIG. 2, but respectively, during uniform and non-uniform deflection.

Figure 4:
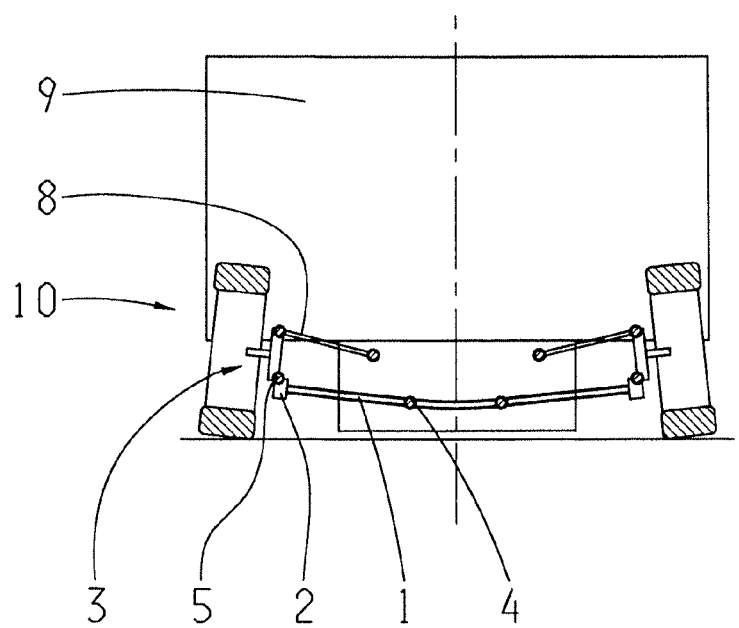
FIG. 4: Schematic front view of the wheel suspension system in FIG. 2, during uniform deflection.
Figure 5:
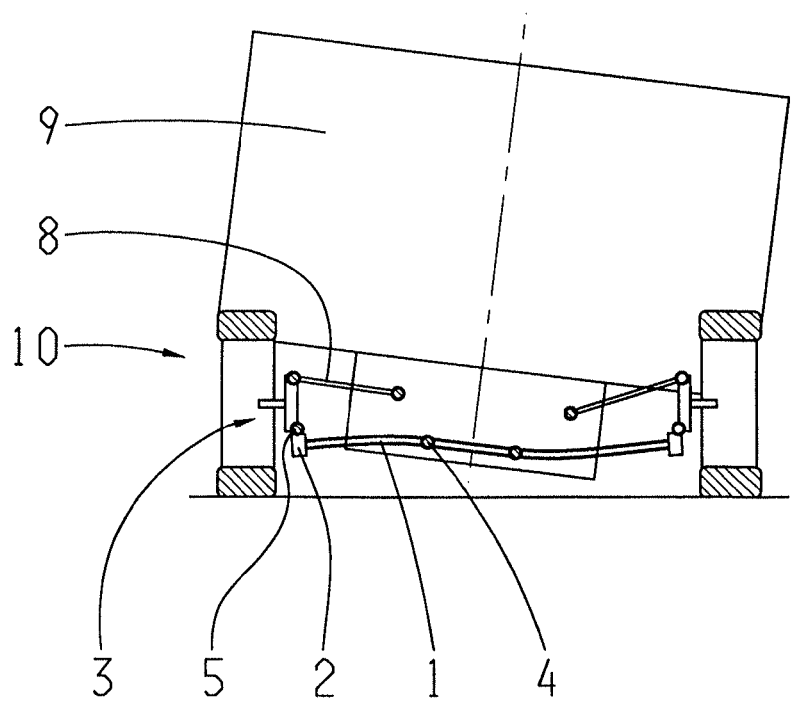
FIG. 5: Schematic front view of the wheel suspension system in FIG. 2, during non-uniform deflection.

In FIG. 4, the wheels 10 are uniformly deflected, for example as the motor vehicle drives over a road bump extending transversely to the driving direction, whereby the transverse leaf spring 1 is elastically stressed and adopts a U-shape. During this, via the first mountings 4 the transverse leaf spring 1 pushes the body 9 back to the rest position shown in FIG. 2 and thus fulfills the function of a vertical spring. In contrast, in FIG. 5 the body 9 is pushed in a sideways direction, for example while driving round a curve, so that only one of the wheels 10 is deflected relative to the body 9. During this, under elastic stress the transverse leaf spring 1 adopts an S-shape and, again via the first mountings 4, pushes the body 9 back to its rest position, thus fulfilling the function of a stabilizer.

In a further design version of the invention the control arms 2 are also fiber-composite components, which is in particular being advantageous with regard to weight.

INDEXES

1 Transverse leaf spring
2 Control arm
3 Wheel carrier
4 First mounting
5 Third mounting
6 Third mounting
7 Second mounting
8 Camber control arm
9 Vehicle body
10 Wheel
11 Longitudinal direction

The invention claimed is:

1. An axle for a motor vehicle, the axle comprising:
at the least a transverse leaf spring (1) attached either directly, or via an auxiliary support frame, to a body (9) of the motor vehicle by a pair of first mountings (4),
two control arms (2), and
two wheel carriers (3),
wherein, in each case, an end of the transverse leaf spring (1), facing toward a respective wheel (10) of the motor vehicle, is rigidly connected to one of the two control arms (2), and the two control arms (2) are both orientated substantially in a longitudinal direction of the motor vehicle,
each of the two control arms (2) is connected by a second mounting (7) either directly, or via an auxiliary support frame, to the body (9), and
each of the two control arms (2) is connected by two third mountings (5, 6) to one of the two wheel carriers (3).

2. The axle for a motor vehicle, according to claim 1, wherein a camber control arm (8), associated with each of the two wheel carriers (3), is connected thereto, and is connected either directly or via an auxiliary support frame to the body (9).

3. The axle for a motor vehicle, according to claim 1, wherein the transverse leaf spring (1) is manufactured as a fiber-composite component.

4. The axle for a motor vehicle, according to claim 1, wherein each of the first mountings (4) are in the form of rubber-metal bearings.

5. The axle for a motor vehicle, according to claim 1, wherein the control arms (2) are manufactured as fiber-composite components.

6. The axle for a motor vehicle, according to claim 1, wherein the two third mountings that connect each of the two control arms to a respective one of the wheel carriers are spaced from each other in the longitudinal direction of the motor vehicle.

7. The axle for a motor vehicle, according to claim 6, wherein each of the two wheel carries defines a vertical axis, and one end of two camber control rods is connected either directly or via an auxiliary support frame to the body (9) and an opposite end of the two camber control rods is connected to a respective one of the two wheel carriers, each of the two control arms is connected, via the two third mountings, to a bottom portion of the respective wheel carrier with respect to the vertical axes and each of the two camber control rods is connected to an upper potion of the respective wheel carrier with respect to the vertical axes.

8. An axle for a motor vehicle, the axle comprising:
a transverse leaf spring (1) fixed to a body (9) of the motor vehicle by a pair of first mountings (4),
two control arms (2), and
two wheel carriers (3),
the transverse leaf spring (1) having two opposed ends that are remote from each other and adjacent a respective wheel (10) of the motor vehicle, each of the two opposed ends of the transverse leaf spring (1) being rigidly connected to a respective one of the two control arms (2),
the two control arms (2) being orientated in a substantially longitudinal direction of the motor vehicle, and each of the two control arms (2) being connected by a second mounting (7) to the body (9) of the motor vehicle, and
each of the two control arms (2) being connected, by a third mounting (5) and a four mounting (6), to one of the wheel carriers (3).

9. The axle for a motor vehicle, according to claim 8, wherein the third and the fourth mountings that connect each of the two control arms to a respective one of the wheel carriers are spaced from each other in the longitudinal direction of the motor vehicle.

10. The axle for a motor vehicle, according to claim 9, wherein each of the two wheel carries defines a vertical axis, and one end of two camber control rods is connected either directly or via an auxiliary support frame to the body (9) and an opposite end of the two camber control rods is connected to a respective one of the two wheel carriers, each of the two control arms is connected, via the third and the fourth mountings, to a bottom portion of the respective wheel carrier with respect to the vertical axes and each of the two camber control rods is connected to an upper potion of the respective wheel carrier with respect to the vertical axes.

* * * * *